United States Patent
Somogyi

(10) Patent No.: US 7,353,495 B2
(45) Date of Patent: Apr. 1, 2008

(54) METHOD FOR PROTECTION AGAINST INTERLEAVING TRANSACTIONS USING A TRANSACTION MANAGER

(75) Inventor: Alexander J. Somogyi, Bernardsville, NJ (US)

(73) Assignee: BEA Systems, Inc., San Jose, CA (US)

( * ) Notice: Subject to any disclaimer, the term of this patent is extended or adjusted under 35 U.S.C. 154(b) by 624 days.

(21) Appl. No.: 10/789,010

(22) Filed: Feb. 27, 2004

(65) Prior Publication Data

US 2004/0210590 A1 Oct. 21, 2004

Related U.S. Application Data

(60) Provisional application No. 60/451,354, filed on Feb. 28, 2003.

(51) Int. Cl.
*G06F 9/44* (2006.01)
*G06F 9/46* (2006.01)
(52) U.S. Cl. .................. 717/120; 707/100; 718/100
(58) Field of Classification Search ........ 717/100–123; 718/100; 707/100
See application file for complete search history.

(56) References Cited

U.S. PATENT DOCUMENTS

| | | | | |
|---|---|---|---|---|
| 6,052,731 A | 4/2000 | Holdsworth | ................ | 709/229 |
| 6,157,927 A | 12/2000 | Schaefer | ..................... | 707/103 |
| 6,272,675 B1* | 8/2001 | Schrab et al. | ................ | 717/100 |
| 6,275,863 B1 | 8/2001 | Leff | ............................ | 709/248 |
| 6,470,342 B1* | 10/2002 | Gondi et al. | .................. | 707/10 |
| 2002/0087366 A1 | 7/2002 | Collier | | |
| 2002/0194244 A1* | 12/2002 | Raventos | ..................... | 709/101 |
| 2004/0153349 A1* | 8/2004 | K. et al. | ........................ | 705/7 |
| 2004/0215773 A1* | 10/2004 | Strait et al. | ................. | 709/225 |
| 2005/0015425 A1* | 1/2005 | Kumar et al. | ............... | 709/200 |
| 2005/0120036 A1* | 6/2005 | Verma et al. | ............... | 707/100 |

OTHER PUBLICATIONS

Wills et al., Resource-driven resource location, IEEE, Jan. 1993 pp. 80-89 vol. 2.*

(Continued)

*Primary Examiner*—Wei Zhen
*Assistant Examiner*—Satish S Rampuria
(74) *Attorney, Agent, or Firm*—Fliesler Meyer LLP

(57) ABSTRACT

A transaction manager maintains an enlistment data structure used for managing resource object enlistment. A transaction manager may receive an enlistment request initiated from a resource object. Upon receiving the request, the transaction manager will determine if the resource object is already enlisted. If the resource object is already enlisted, the transaction manager will block the enlistment request. If the resource object is not enlisted, the transaction manger will enlist the resource. Upon enlistment, the resource object will perform a requested task or service. After the requested task or service is complete, the resource initiates a delistment request to the transaction manager. After receiving the delistment request from the resource, object, the transaction manager is delisted from the enlistment data structure.

20 Claims, 4 Drawing Sheets

OTHER PUBLICATIONS

Saewong et al., Cooperative scheduling of multiple resources, IEEE, 1999 pp. 90-101.*

Allamaraju, Nuts and Bolts of Transaction Processing, extracted from http://www.subbu.org/articles/transactions/NutsAndBoltsOfTP.html, Subbu Allamaraju 1999 on Jan. 18, 2007; pp. 1-33.*

How to handle global transactions in heterogeneous database systems, Muth, P.; Klas, W.; Neuhold, E.J., Research Issues on Data Engineering, 1992: Transaction and Query Processing. Second International Workshop on, Feb. 1992, IEEE, pp. 192-198.*

On structural features of global transactions in multidatabase systems, Zhang, A.; Jing, J., Research Issues in Data Engineering, 1993: Interoperability in Multidatabase Systems, 1993. Proceedings RIDE-IMS '93., Third International Workshop on, Apr. 19-20, 1993, IEEE, pp. 199-206.*

Global scheduling for flexible transactions in heterogeneous distributed database systems, Aidong Zhang; Nodine, M.; Bhargava, B., Transactions on Knowledge and Data Engineering, vol. 13 Issue: 3 2001, IEEE, pp. 439-450.*

* cited by examiner

Fig. 2 - Prior Art

METHOD FOR PROTECTION AGAINST INTERLEAVING TRANSACTIONS USING A TRANSACTION MANAGER

CLAIM TO PRIORITY

The present application claims the benefit of priority under 35 U.S.C. §119(e) to U.S. Provisional Patent Application entitled "A METHOD FOR PROTECTING AGAINST TRANSACTION MANAGER FOR PROTECTION AGAINST INTERLEAVING TRANSACTIONS", Application No. 60/451,354, filed on Feb. 28, 2003, which application is incorporated herein by reference.

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 10/788,802, entitled "PROTECTION AGAINST INTERLEAVING TRANSACTIONS USING A TRANSACTION MANAGER," filed on Feb. 27, 2004, currently pending.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to global transaction management in application servers, and more particularly to global transaction management between multiple applications in application server systems.

BACKGROUND OF THE INVENTION

Transaction managers in enterprise systems may be used to monitor and manage transactions between resources and applications in application server systems. In particular, the transaction manager monitors global transactions and provides servers and resources within an application server system with status and availability information regarding other servers and resources.

The transaction manager may be provided by the application sever provided. One such provider of application servers is BEA Systems, Inc. of San Jose, Calif., who provide the Web Logic Server application server system. The WebLogic Server (WLS) Transaction Manager (TM) implements the J2EE™ JTA specification. This specification is based on the OpenGroup Distributed Transaction Processing Model (DTPM). A typical J2EE™ distributed transaction processing model 100 is depicted in FIG. 1. Distributed Transaction Processing Model 100 includes applicatidn (App) 110, resource manager (RM) 120, and transaction manager (TM) 130 The TM coordinates two-phase commit (2PC) transactions that involve multiple resources. Resources developed by third parties may be utilized in WLS applications because they adhere to the J2EE™ standards. The App communicates wit the RM using an API such as JDBC™ (far relational databases) and JMS (for queuing systems). The App controls transaction demarcation using the JTA API The TM communicates with the RM during 2PC processing using the X/Open XA interface, specifically the XAResource interface as defined in the J2EE™ JTA specification. This interface provides methods for enlisting and delisting a resource in a global transaction, preparing the resource (first phase of 2PC), and committing or rolling back the resource (second phase of 2PC). There are also methods for use in failure recovery (recover), resource comparison (isSameRM) and error processing (forget).

Application components access an RM using the various APIs. These APIs typically utilize a logical connection to the resource. A logical resource connection is often associated with a XAResource instance. Enlistment of a resource in a global transaction entails having the TM associate the unique transaction identifier (Xid) with work that is performed in the resource, and is performed by invoking the XAResource.start() method on the resource. Subsequent application updates to the resource will be associated with the global transaction. Resource delistment entails having the TM invoke XAResource.end on the resource, which disassociates future application updates on the resource over the logical connection from the previously enlisted Xid.

FIG. 2 illustrates a typical resource enlistment process 200. In process 200, the App 110 first begins a global transaction at step 210. The App then accesses the resource and invokes an update operation op the resource at step 220 using an API specific to the resource. For instance, the App may perform a JDBC™ update operation. When the update operation is invoked on the resource, the resource first makes a call into the TM at step 230 using the Transaction-.enlistResource method. The resource passes the TM the XAResource object that the TM needs to utilize in order to perform the transaction enlistment and 2PC processing when the transaction is later committed or rolled back. In response to the enlistResource call, the TM will invoke XAResource-.start on the resource at step 240. The application update is then performed in the resource at step 250 and is associated with the transaction that was specified during the enlistment start method. After the application request has been processed, the resource may invoke the delistResource method on the TM at step 260 to disassociate future operations from the transaction. The TM responds by calling XAResource.end on the resource at step 270. The process 200 of resource enlistment is then complete.

While a first application has a logical connection with a resource, a second application may attempt to establish a logical connection with the same resource or attempt a concurrent update to the resource. In such a case, the second connection attempt would fail and result in an exception because to have different transactions simultaneously enlisted with a single logical connection is an XA protocol violation.

What is needed is a transaction manager that can manage multiple transaction requests from a resource object, thereby improving the efficiency of global transaction processing.

SUMMARY OF THE INVENTION

In one embodiment of the present invention, a method is provided in which a transaction manager maintains an enlistment data structure used for managing resource object enlistment in global transactions. A transaction manager receives an enlistment request initiated from a resource object. Upon receiving the request, the transaction manager determines if the resource object is already enlisted within the data structure. If the resource object is enlisted, the transaction manager will block the enlistment request. If the resource object is not enlisted, the transaction manger will enlist the resource. Upon enlistment, the resource object will perform a requested task or service and the resource is considered locked. After the requested task or service is complete, the resource initiates a delistment request to the transaction manager. After receiving the delistment request from the resource object, the transaction manager is delisted from the enlistment data structure.

DETAILED DESCRIPTION

In one embodiment of the present invention, a transaction manager maintains an enlistment data structure used for managing resource object enlistment. A transaction manager may receive an enlistment request initiated from a resource object. Upon receiving the request, the transaction manager will determine if the resource object is already enlisted. If the resource object is already enlisted, the transaction manager will block the enlistment request. If the resource object is not enlisted, the transaction manger will enlist the resource. Upon enlistment, the resource object will perform a requested task or service and the resource is considered locked. After the requested task or service is complete, the resource initiates a delistment request to the transaction manager. After receiving the delistment request from the resource object, the transaction manager is delisted from the enlistment data structure.

Figure 1:
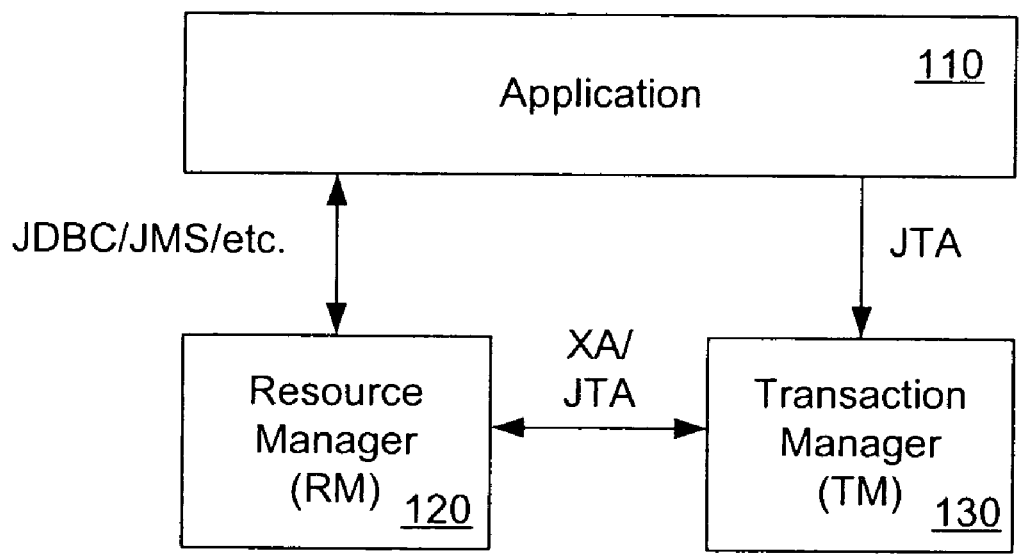
FIG. 1 is an illustration of a J2EE™ Distributed Transaction Processing Model in accordance with the prior art.
Figure 2:
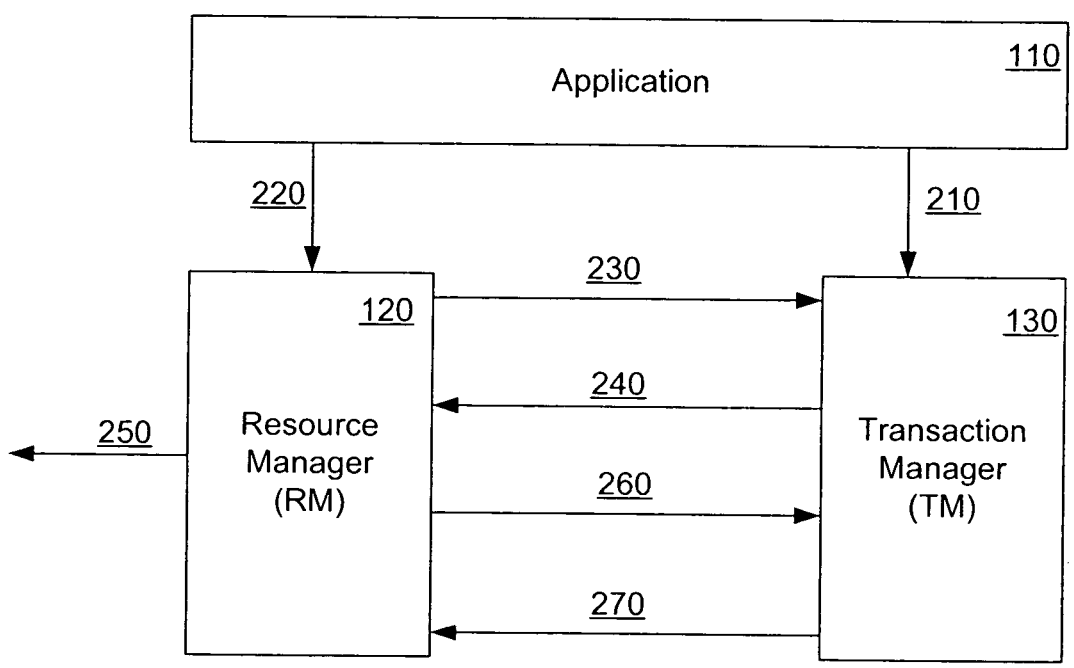
FIG. 2 is an illustration of a method for implementing resource enlistment in accordance with the prior art.
Figure 3:
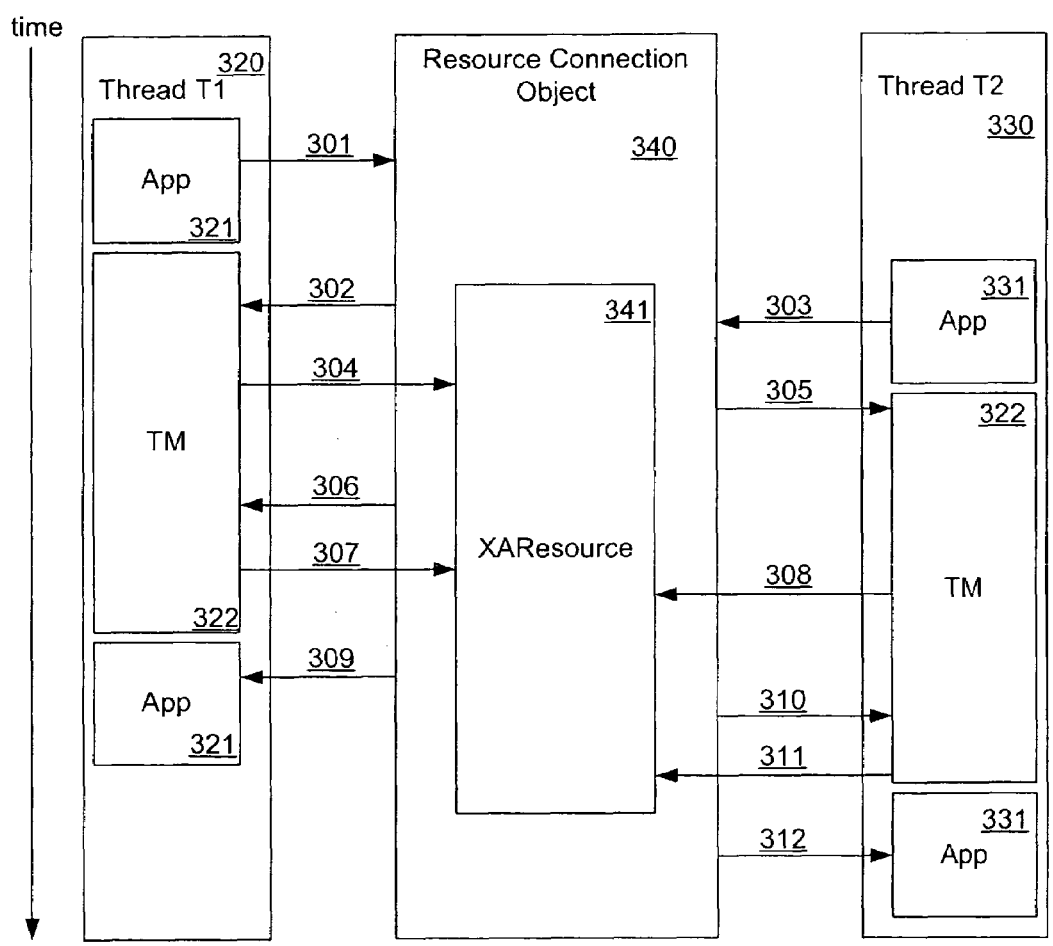
FIG. 3 is an illustration of a method for implementing interleaving resource enlistment in accordance with one embodiment of the present invention.

FIG. 3 illustrates a system 300 for implementing interleaving resource enlistment in accordance with one embodiment of the present invention. System 300 includes thread T1 320, App 321, TM 322, thread T2 330, App 331, resource connection object 340, and XAResource 341. In one embodiment, system 300 maybe implemented on an application sewer system. The application server system may be on a single machine or several machines. Apps 321 and 331 may request a service from a resource during a connection involving different types of APIs. The system and methods of the present invention may be implemented using the different types of APIs and their related connection formats, including connections for JDBC™ and sessions for JMS.

Elements 301 through 312 represent communications that comprise the interleaving enlistment process. First in the process, App 321 makes a call to update a resource at 301. The call is received by resource connection object 340. The request may include a call to a method in the resource object, and may include the passing of parameters to the resource object. Next, the resource connection object 340 places a call to the TM at 302. In one embodiment, the call from the resource to the transaction manager may be over an XA protocol interface. The call may include resource object information and may be to a method that enlists resources, such as enlistResource, thus informing the transaction manager that current work performed by the resource is to be associated with the current transaction. After receiving the call, the transaction manager enlists the resource in the transaction. Next, the TM will then signal at 304 to the resource to begin processing the call to the resource.

At some point in the operation of system 300, an App 331 may make a call 303 to the resource connection object 340. In another embodiment, an App may make a call to the resource connection object 340 at some point before or after the call 303 by App 331 as illustrated in FIG. 3. The TM of the interleaving enlistment system 300 will handle the call by the subsequent App call in serial as long as App 321 is already enlisted.

At 305, the resource connection object places another call to the TM at 302. The enlistment request by thread T2 330 is blocked until the in-progress enlistment of thread T1 completes. The blocked enlistment of thread T2 prevents different transactions enlisted with a logical connection to the same resource at the same time.

Once the resource receives a start signal from the TM at 304, the resource 341 performs the task requested by App 321 in thread T1 320. In one embodiment, the task involves performing operations of a resource object method called by the application. After a result is obtained for the requested task, the resource object initiates delistment. In one embodiment, the resource object calls a delist resource method in the transaction manager at 306. Calling the delist resource method on the TM delists the resource from the current transaction. In one embodiment, the call to delist the resource includes the transaction ID (XID) as a parameter. In response to the delist resource method call to the TM, the TM makes a call 307 to the resource to end the logical connection associated with the current transaction. In one embodiment, the TM calls a XA resource end method on the resource object and provides the XID as a parameter. After receiving an end call 307 from the TM, the resource object may perform a self update such that resource object actions are no longer associated with the XID. Additionally, the resource may provide a result to the application at 309 that requested the resource services. In another embodiment, the result may be provided before, after, or during the resource delistment depending upon the particular resource design and implementation of the transaction manager, resource object, and client application.

After the TM places a call 307 to the XAResource ending the resource's association with the current transaction, the TM makes another call to the XAResource at 308 to initiate the resource to perform work associated with the second thread 330 and corresponding transaction ID. The XAResource then performs work associated with the second thread 330, and delists the resource with the transaction ID in a call 310 to the TM. The TM responds to the delist call 310 by calling the XAResource to indicate that the resource should stop associating work performed with the transaction ID provided at step 308. The XAResource may then provide results at 312 to the application 331 as discussed above with respect to App 321 in step 309.

Figure 4:
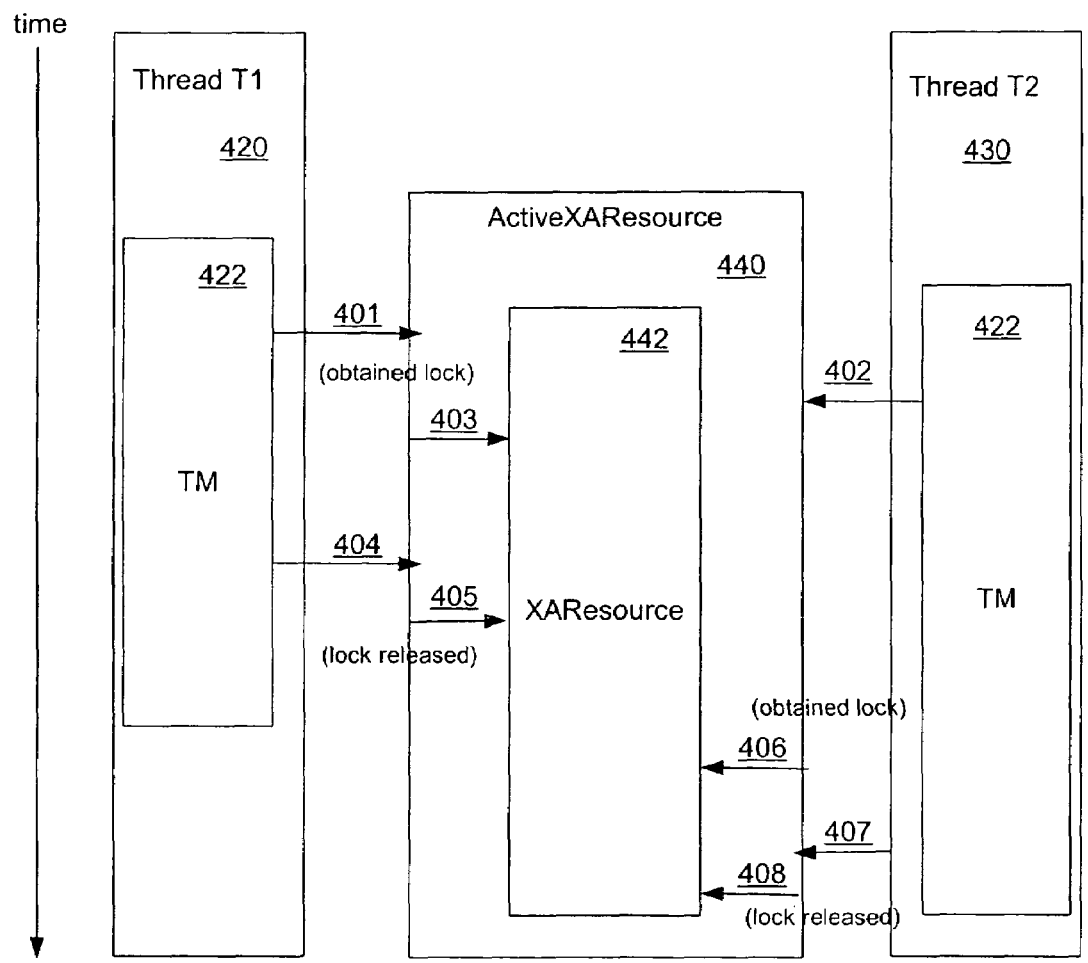
FIG. 4 is an illustration of interleaving resource enlistment synchronization in accordance with one embodiment of the present invention.

An illustration of the interleaving resource enlistment synchronization system 400 is illustrated in FIG. 4. The synchronization system 400 includes thread T1 420, TM 422, thread T2 430, activeXAResource 440, and XAResource 442. In one embodiment, each XAResource instance in a server node (only one illustrated in FIG. 4) is wrapped in an object that the TM will use to synchronize concurrent enlistment requests. The TM maintains a collection of these wrapper objects which are checked for each resource enlistment. In one embodiment, for each request to enlist the resource, the TM will first check to see if there is a lock being held on the resource by another thread of control. If not, the lock is granted to the accessor and held until the owner Xid delists the resource. The waiting threads, if any, will be signaled once the lock is free. Once free, one of the waiting threads will be granted the lock and will be allowed to proceed with its enlistment. In one embodiment, the waiting thread that requested the resource first will be granted the lock. In another embodiment, some other priority method may be used to determine which thread will be granted the lock, such as threads handling a specific type of application. The collection of wrapped XAResource objects may be periodically processed to remove objects that are no unused or no longer active. In one embodiment, the wrapped XAResource objects is periodically garbage collected to clear state and unused entries.

The synchronization process of system 400 is illustrated by steps 401 through 408. In step 401, the TM 422 of the first thread 420 enlists the XAResource 440. The enlistment request is received by ActiveXAResource wrapper 440. By enlisting the XAResource via the wrapper, thread 420 obtains a lock on the XAResource. The ActiveXAResource wrapper than initiates the start of work by the XAResource 442 at step 403. Once the XAResource has completed the work performed for thread 420, the TM delists the XAResource. The delist call 404 is received by ActiveXAResource wrapper 440. The wrapper 440 than sends an end call to XAResource 405, thus ending work performed by the XAResource from being associated with thread 420 and releasing the lock on the XAResource.

The synchronization of the second thread 430 tasks with the tasks of first thread 420 is illustrated in FIG. 4. Once the TM 422 enlists the XAResource and obtains the lock to the resource at step 401, any attempted enlist from the second thread 430 is blocked. Thus, the enlist attempt at step 402 from thread 430 is blocked as it occurs later in time than the enlist step 401 of thread 420. Tn one embodiment, the lock maybe implemented using Java™ monitor or some similar method. The lock is held until the thread has completed performing operations on the resource. After the lock on XAResource 442 is released at step 405, the second thread 430 may obtain the lock at step 406. At this point, the XAResource may begin performing work for the second thread. After the resource is delisted from the transaction ID at step 407, the XAkesource work for the second thread ends at step 408 and the lock on the XAResource is released.

In one embodiment, the transaction manager may maintain an enlistment data structure (EDS) to help manage resource enlistments. The EDS maintains a mapping of resources and transaction identification information currently in use, including XA resource objects. When a resource calls the transaction manager to be enlisted, the transaction manager searches the EDS to determine if the resource is already listed. If the resource is not listed in the EDS, the transaction manager lists the resource in the EDS. In some cases, a thread associated with an application may call a method on a resource already enlisted in the EDS. In this case, the transaction manager will block the enlistment of the resource. The resource then waits until the enlistment of the resource win the EDS is removed.

The transaction manager contains identification information regarding the resource within the EDS at least until the transaction manager receives a signal indicating the resource has generated a result or otherwise completed the service invoked by the initiating application. In one embodiment, enlistments of resources are removed at predetermined time intervals. At each time interval, each enlistment is checked to determine if it has not been accessed for at certain period of time. If an enlistment has not been accessed for the certain period of time, it is delisted from the EDS automatically. In another embodiment, the delistment occurs as soon as the resource has been idle (not accessed) for the certain period of time. In this case, the transaction manager does not wait for the time interval to expire before determining if any resource objects have not been accessed. These methods of delistment reduce the number of add an remove operations associated with the EDS and make the transaction monitor more efficient. The idle period and time check interval may be chosen based on the design and operation of the specific application server system as will be understood by those skilled in the art of application server programming.

In one embodiment of the present invention, a transaction manager maintains an enlistment data structure used for managing resource object enlistment. A transaction manager may receive an enlistment request initiated from a resource object. Upon receiving the request, the transaction manager will determine if the resource object is already enlisted. If the resource object is already enlisted, the transaction manager will block the enlistment request. If the resource object is not enlisted, the transaction manger will enlist the resource. Upon enlistment, the resource object will perform a requested task or service and the resource is considered locked. After the requested task or service is complete, the resource initiates a delistment request to the transaction manager. After receiving the delistment request from the resource object, the transaction manager is delisted from the enlistment data structure.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, maintaining an enlistment data structure, managing thread execution calls, and implementing a transaction manager that protects against interleaving transactions.

The invention claimed is:

1. A method for protection against interleaving transactions, comprising:
    communicating with a resource manager from an application using an Application Programming Interface (API), wherein multiple threads of the application utilize a shared logical connection to the resource manager;
    controlling transaction demarcation using the a Transaction API;
    communicating with the resource manager from a first thread of a transaction manager during two phase commit processing using an XAResource interface;
    enlisting a resource, wherein the first thread of the transaction manager associates a unique transaction identifier with work that is performed on the resource by invoking XAResource.start() on the resource and subsequent application updates to the resource are associated with a global transaction, wherein the resource is wrapped in an object that the transaction manager uses to synchronize concurrent enlistment requests, and wherein the transaction manager maintains a collection of wrapped XAResource objects which is consulted on each resource enlistment;
    delisting a resource, wherein the first thread of the transaction manager invokes XAResource.end() on the resource and future application updates on the resource over the shared logical connection are disassociated from the global transaction; and
    blocking a second thread of the transaction manager from calling XAResource.start() on the resource until the first thread of the transaction manager has called XAResource.end() on the resource.

2. The method of claim 1, wherein the application communicates to the resource manager using a database connection API or JMS.

3. The method of claim 1, wherein each request to enlist the resource will first check to see if there is a lock being held on the resource by another thread of control.

4. The method of claim 3, wherein if a resource is not yet locked, a lock is granted to an accessor and held until the owner of the transaction ID delists the resource.

5. The method of claim 4, wherein waiting threads are signaled when a lock is freed and one of the waiting threads will be granted the lock and allowed to proceed with its enlistment.

6. The method of claim 5, wherein the collection of wrapped XAResource objects is periodically garbage collected to clear stale and unused entries.

7. The method of claim 1, wherein the transaction manager maintains an enlistment data structure to manage the collection of wrapped XAResource objects.

8. The method of claim 7, wherein the transaction manager contains identification information regarding the resource within the enlistment data structure at least until the transaction manager receives a signal indicating the resource has generated a result or completed a service invoked by the application.

9. The method of claim 8, wherein at a predetermined time interval, each enlistment of a resource that has not been accessed for a certain period of time is delisted from the enlistment data structure.

10. The method of claim 8, wherein a resource is delisted from the enlistment data structure when it has not been accessed for a certain period of time.

11. A computer-readable storage medium, storing instructions for protection against interleaving transactions, the instructions comprising:
    communicating with a resource manager from an application using an Application Programming Interface (API), wherein multiple threads of the application utilize a shared logical connection to the resource manager;
    controlling transaction demarcation using the a Transaction API;
    communicating with the resource manager from a first thread of a transaction manager during two phase commit processing using an XAResource interface;
    enlisting a resource, wherein the first thread of the transaction manager associates a unique transaction identifier with work that is performed on the resource by invoking XAResource.start() on the resource and subsequent application updates to the resource are associated with a global transaction, wherein the resource is wrapped in an object that the transaction manager uses to synchronize concurrent enlistment requests, and wherein the transaction manager maintains a collection of wrapped XAResource objects which is consulted on each resource enlistment;
    delisting a resource, wherein the first thread of the transaction manager invokes XAResource.end() on the resource and future application updates on the resource over the shared logical connection are disassociated from the global transaction; and
    blocking a second thread of the transaction manager from calling XAResource.start() on the resource until the first thread of the transaction manager has called XAResource.end() on the resource.

12. The computer-readable storage medium of claim 11, wherein the application communicates to the resource manager using a database connection API or JMS.

13. The computer-readable storage medium of claim 11 wherein each request to enlist the resource will first check to see if there is a lock being held on the resource by another thread of control.

14. The computer-readable storage medium of claim 13, wherein if a resource is not yet locked, a lock is granted to an accessor and held until the owner of the transaction ID delists the resource.

15. The computer-readable storage medium of claim 14, wherein waiting threads are signaled when a lock is freed and one of the waiting threads will be granted the lock and allowed to proceed with its enlistment.

16. The computer-readable storage medium of claim 15, wherein the collection of wrapped XAResource objects is periodically garbage collected to clear stale and unused entries.

17. The computer-readable storage medium of claim 11, wherein the transaction manager maintains an enlistment data structure to manage the collection of wrapped XAResource objects.

18. The computer-readable storage medium of claim 17, wherein the transaction manager contains identification information regarding the resource within the enlistment data structure at least until the transaction manager receives a signal indicating the resource has generated a result or completed a service invoked by the application.

19. The computer-readable storage medium of claim 18, wherein at a predetermined time interval, each enlistment of a resource that has not been accessed for a certain period of time is delisted from the enlistment data structure.

20. The computer-readable storage medium of claim 18, wherein a resource is delisted from the enlistment data structure when it has not been accessed for a certain period of time.

* * * * *

UNITED STATES PATENT AND TRADEMARK OFFICE
CERTIFICATE OF CORRECTION

PATENT NO.        : 7,353,495 B2                                                                Page 1 of 1
APPLICATION NO.   : 10/789010
DATED             : April 1, 2008
INVENTOR(S)       : Somogyi It is certified that error appears in the above-identified patent and that said Letters Patent is hereby corrected as shown below:

In column 1, line 63, delete "applicatidn" and insert -- application --, therefor.

In column 1, line 65, delete "130" and insert -- 130. --, therefor.

In column 2, line 2, delete "wit" and insert -- with --, therefor.

In column 2, line 3, delete "qucuing" and insert -- queuing --, therefor.

In column 2, line 5, delete "API" and insert -- API. --, therefor.

In column 3, line 50, delete "maybe" and insert -- may be --, therefor.

In column 3, line 51, delete "sewer" and insert -- server --, therefor.

In column 5, line 39, delete "Tn" and insert -- In --, therefor.

In column 5, line 47, delete "XAkesource" and insert -- XAResource --, therefor.

In column 7, line 34, in claim 1, before "a" delete "the".

In column 8, line 32, in claim 11, before "a" delete "the".

Signed and Sealed this

Ninth Day of February, 2010

David J. Kappos
*Director of the United States Patent and Trademark Office*